Patented June 26, 1934

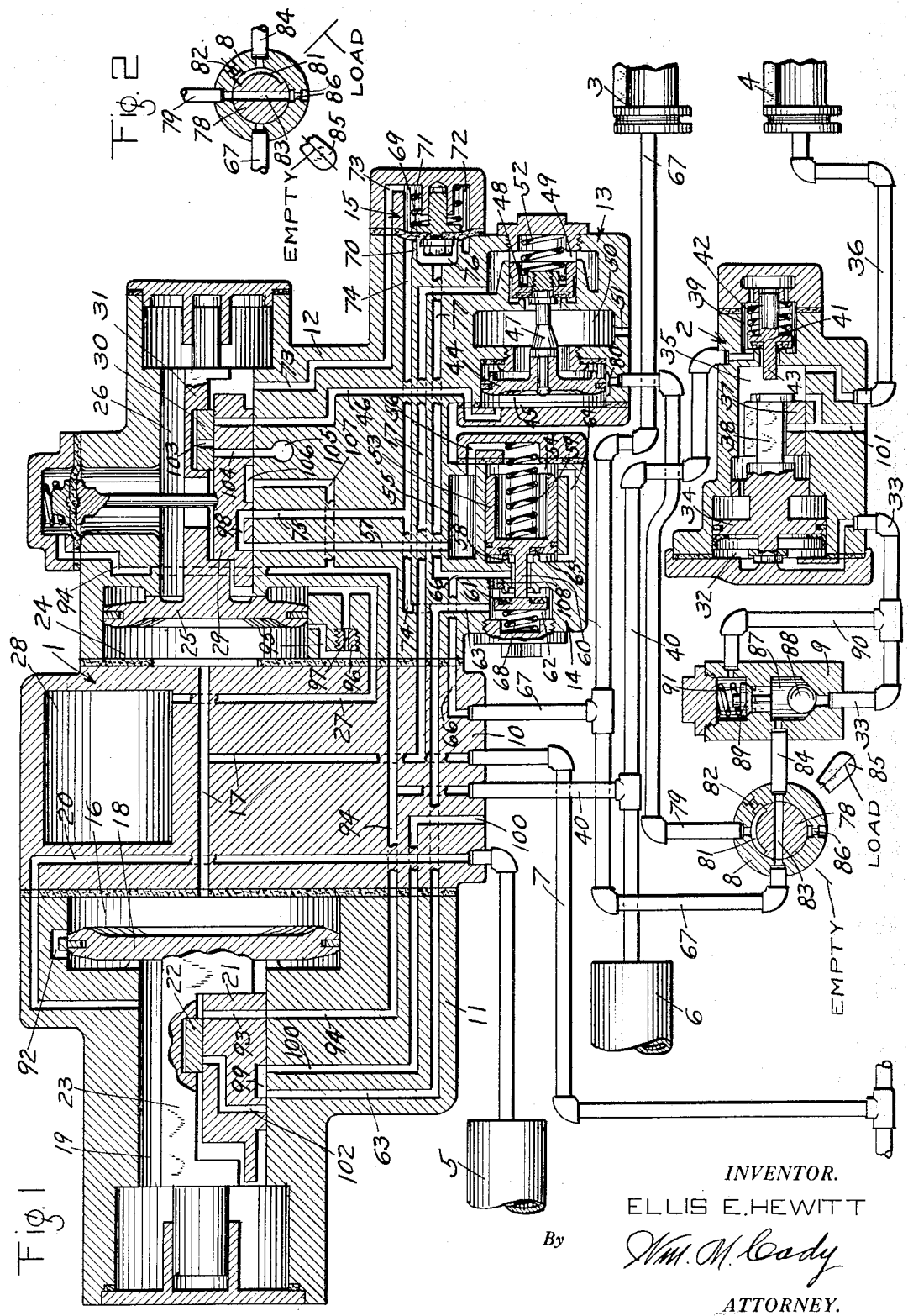

1,964,055

UNITED STATES PATENT OFFICE 1,964,055

LOAD BRAKE APPARATUS

Ellis E. Hewitt, Edgewood, Pa., assignor to The Westinghouse Air Brake Company, Wilmerding, Pa., a corporation of Pennsylvania Application November 17, 1931, Serial No. 575,507

9 Claims. (Cl. 303—23)

This invention relates to fluid pressure brakes, and more particularly to a fluid pressure brake equipment in which the brakes are applied with greater force on loaded cars than on empty cars.

When an emergency application of the brakes is effected on a long train, the slack in the train is liable to run in so rapidly as to cause excessive and damaging shocks, due to the fact that the brakes are heavily applied on cars at the front end of the train before the brakes are applied on cars at the rear end of the train.

In order to overcome this difficulty, it has heretofore been proposed to provide a fluid pressure brake equipment having means adapted, when an emergency application of the brakes is effected, to first supply fluid under pressure to the brake cylinder at a rapid rate, but limited in amount such that the initial inshot of fluid under pressure will only be sufficient to move the brake cylinder piston out so that the brake shoes will be applied to the wheels with a light force. Fluid under pressure is then supplied to the brake cylinder at a restricted rate for a period of time sufficient to permit the slack in the train to run in gently, and finally, after the slack has run in, fluid under pressure is supplied to the brake cylinder at a more rapid rate, to apply the brakes with the desired force.

The principal object of my invention is to provide a fluid pressure brake equipment of the above type and associated with an empty and load brake apparatus in such manner that a braking force is provided on a loaded car which is less than that obtained on an empty car during the initial brake cylinder pressure build up period, and such that a different delay period in which fluid is supplied to the brake cylinder at a restricted rate, is provided on a loaded car than is obtained on an empty car.

For example, if the braking ratio, that is to say, the percentage obtained by dividing the braking force by the weight of the car, is twelve per cent on an empty car as a result of the initial inshot build-up of brake cylinder pressure, then on a loaded car, the braking ratio will be a lower percentage. If there is provided a delay period of fifteen seconds on an empty car during which the brake cylinder pressure is slowly built up, a longer delay period, such as twenty seconds, will be provided on a loaded car.

Other objects and advantages will appear in the following more detailed description of the invention.

In the accompanying drawing; Fig. 1 is a diagrammatic sectional view of a fluid pressure brake equipment embodying my invention; and Fig. 2 a sectional view of the empty and load change-over valve employed in Fig. 1, showing the valve in its empty car position.

As shown in the drawing, the fluid pressure brake equipment may comprise a brake controlling valve device 1, a load brake controlling valve device 2, an empty brake cylinder 3, a load brake cylinder 4, an auxiliary reservoir 5, an emergency reservoir 6, a brake pipe 7, an empty and load change-over valve device 8, and a check valve device 9.

The controlling valve device 1 may comprise a pipe bracket 10 to which is secured a triple valve casing 11, and an emergency valve casing 12, and contained in the emergency valve casing is a quick action valve device 13, an initial inshot valve device 14, and a timing valve device 15.

In the triple valve casing 11 is a piston chamber 16, connected to passage 17 leading to the brake pipe 7 and containing piston 18. At the opposite side of piston 18 is a valve chamber 19, connected by passage 20 to the auxiliary reservoir 5 and containing a main slide valve 21 and a graduating slide valve 22 adapted to be operated, through a stem 23 by piston 18.

In the emergency valve casing 12 is a piston chamber 24, connected to brake-pipe passage 17 and containing piston 25. At the opposite side of piston 25 is a valve chamber 26, connected through passage 27 with a quick action chamber 28 and containing a main slide valve 29 and an auxiliary slide valve 30, adapted to be operated through a stem 31, by piston 25.

The load brake controlling valve device 2 comprises a casing having a piston chamber 32, connected to a pipe 33 and containing a piston 34. At the opposite side of the piston 34 is a valve chamber 35, connected through pipe 36 with the load brake cylinder 4 and containing a slide valve 37, adapted to be operated through a stem 38 by piston 34. The casing also has a valve chamber 39, connected by pipe 40 to the emergency reservoir 6, and containing a poppet valve 41, urged to its seat by a coil spring 42, and having a stem 43 adapted to be engaged by piston stem 38 upon movement of the stem 38 to the right, the valve 41 controlling communication from valve chamber 39 to valve chamber 35.

The quick action valve device 13 comprises a piston 44, contained in a piston chamber 45, which is connected to a passage 46, leading to the seat of slide valve 29. The piston 44 is provided with a stem 47 for operating a vent valve 48 contained in valve chamber 49, said valve chamber being connected to brake pipe passage 17. The valve 48 controls the venting of fluid under pressure from valve chamber 49 and the brake pipe to a chamber 50 which is open to the atmosphere by way of a port 51. The valve 48 is urged to its seat by a coil spring 52.

The initial inshot valve device 14 comprises a valve piston 53 having the chamber 54 at one side connected to a volume reservoir 55 through a passage 56, the reservoir 55 being connected to a passage 57 leading to the seat of the emergency slide valve 29. The valve portion 53 is provided with a seat adapted to engage a seat rib 58 and a coil spring 59 urges the valve piston into engagement with said seat rib. The valve piston 53 is provided with a stem 60 adapted to operate a poppet valve 61 contained in valve chamber 62, said valve chamber being connected to a passage 63, leading to the seat of the main slide valve 21.

In the left hand seated position of the valve piston 53, a passage 64 connects chamber 65 with chamber 54. When the valve 61 is unseated, valve chamber 62 is connected to a passage 66 which leads to pipe 67, which pipe communicates with the empty brake cylinder 3. A coil spring 68 urges the valve 61 to its seat.

The final inshot timing valve device 15 comprises a flexible diaphragm 69 adapted to engage a seat rib 70 upon movement to the left, the diaphragm being urged to this position by a coil spring 71. The chamber 72 at the spring side of the diaphragm 69 is connected to a passage 73 which leads to and is open at all times to the emergency valve chamber 26. The chamber at the area of the diaphragm 69 outside the seat rib 70 is connected to a passage 74 which opens into passage 63 and which has a branch passage 75, leading to the seat of the emergency slide valve 29.

The chamber 76 at the area of the diaphragm 69 within the seat rib 70 is connected to a passage 77 which opens into passage 66.

The empty and load change-over valve device 8 comprises a casing in which is mounted a plug valve 78. A pipe 79, leading to an equalizing groove 80, controlled by the emergency quick action piston 44, leads to the casing 8 and in the load position of the valve 78, the pipe 79 is connected through a cavity 81 with a restricted port 82, opening to the atmosphere. In the load position, a port 83, through the valve 78, connects empty brake cylinder pipe 67 with a pipe 84, leading to the check valve device 9. The valve 78 is adapted to be rotated by means of a handle 85.

In the empty position of the change-over valve, as shown in Fig. 2, the cavity 81 connects pipe 84 with the atmospheric exhaust port 82, while port 83 connects pipe 79 with a restricted atmospheric exhaust port 86.

The check valve device 9 comprises a casing having a valve chamber 87 connected to pipe 84 and containing a ball check valve 88 which controls communication from pipe 33 to valve chamber 87. A check valve 89 is also mounted in the casing and controls communication from valve chamber 87 to a by-pass pipe 90, which is connected to pipe 33. The check valve 89 is urged to its seat by a coil spring 91.

In operation, when the brake pipe 7 is charged with fluid under pressure in the usual manner, fluid under pressure flows from the brake pipe through passage 17 to piston chamber 16 of the triple valve device 11 and shifts piston 18 to release position, as shown in the drawing, in which position, a feed port 92 around the piston 18 permits flow of fluid from piston chamber 16 to valve chamber 19. From valve chamber 19, fluid under pressure flows through passage 20 to the auxiliary reservoir 5, charging said reservoir to the pressure carried in the brake pipe.

In the release position of triple slide valve 21, a port 93 in the slide valve registers with passage 94 which opens to pipe 40, so that the emergency reservoir 6 is charged with fluid under pressure.

The piston chamber 24 of the emergency valve device 12 is charged from the brake pipe through passage 17 and fluid flows from piston chamber 24 by way of passage 95 to valve chamber 26, with piston 25 in release position. The passage 95 contains a choke plug 96 having a restricted flow port 97. The quick action chamber 28 is also charged with fluid under pressure by way of passage 27. In the release position of the emergency slide valve 29, passage 57 is connected through a cavity 98 with passage 75.

With the triple valve device in release position, passage 63 is connected, through cavity 99 with an atmospheric exhaust passage 100, and consequently, the empty brake cylinder 3 is open to the atmosphere by way of pipe 67, passage 66 and passage 63, the valve 61 being unseated, the passage 66 will be connected to passage 63. The passage 74 leads to passage 63, so that chamber 54 and the volume reservoir 55 are now at atmospheric pressure, since passage 57, leading to the reservoir is open to the atmosphere by way of cavity 98, passage 75, passage 74, and passage 63.

In the load position of the change-over valve device 8, the piston chamber 32 of the load brake controlling valve device 2 is connected to empty brake cylinder pipe 67 through pipe 33, past check valve 88 to pipe 84, and through port 83 in the plug valve 78, to pipe 67, so that piston chamber 32 is at atmospheric pressure and piston 34 will be in the position shown in Fig. 1, in which slide valve 37 opens communication from valve chamber 35 to atmospheric exhaust port 101. The load brake cylinder 4, being connected to valve chamber 35, through pipe 36, is therefore maintained at atmospheric pressure.

When a gradual reduction in brake pipe pressure is effected, to cause a service application of the brakes, the triple piston 18 is moved to the right, first shifting the graduating valve 22 to lap the port 93 and uncover the service port 102, and then shifting the main slide valve 21 until the port 102 registers with passage 63.

Fluid under pressure is then supplied from valve chamber 19 and the auxiliary reservoir 5 to passage 63 and flows thence past the unseated valve 61 to passage 66 and through pipe 67 to the empty brake cylinder 3. The change-over valve device 8 being in load position, as shown in Fig. 1, fluid under pressure in pipe 67 flows through port 83 and pipe 84 to valve chamber 87. When the fluid pressure in the empty brake cylinder 3 and in pipe 67 has been increased to a predetermined degree, sufficient to overcome the pressure of spring 91, the check valve 89 will be unseated, permitting the flow of fluid under pressure to piston chamber 32 of the load brake controlling valve device 2.

Piston 34 is then moved to the right by fluid under pressure supplied to piston chamber 32, first moving the release valve 37 so as to lap the atmospheric exhaust port 101 and then causing the piston stem 38 to engage valve stem 43. When the pressure in piston chamber 32 has been increased sufficiently to overcome the pressure of spring 42, the stem 43 is operated to unseat the valve 41, and permit the flow of fluid under pressure from the emergency reservoir 6, which is connected to valve chamber 39, to valve chamber 35 and thence to the load brake cylinder 4. When the pressure of fluid supplied to the load brake cylinder 4 and acting in valve chamber 35 on piston 34, slightly exceeds the pressure of fluid supplied to piston chamber 32, the piston 34 is moved to the left, permitting the spring 42 to seat the valve 41 and thus cut off the further supply of fluid under pressure to the load brake cylinder 4.

When a gradual reduction in brake pipe pressure is effected, the emergency piston 25 is shifted to the left, so that the auxiliary valve 30 is shifted relatively to the emergency slide valve 29, to a position in which a port 103 in the valve 30 registers with a port 104 in the slide valve 29. Port 104 registers with an atmospheric exhaust passage 105, so that fluid under pressure is now vented from valve chamber 26 and from the quick action reservoir 28 to the atmosphere. The fluid pressure in valve chamber 26 is thus reduced at substantially the rate at which the brake pipe pressure is reduced in piston chamber 24, so that during a gradual service rate of reduction in brake pipe pressure, the piston 25 is not moved to emergency position, and the slide valve 29 therefore remains in its release position, as shown in Fig. 1.

In release position of slide valve 29, cavity 98 connects passage 57 with passage 75, so that fluid at the pressure supplied to the empty brake cylinder 3 is also supplied to volume chamber 55 and to chamber 54 of the inshot valve device 14.

Fluid at the pressure supplied to chamber 54 is also supplied through passage 64 to chamber 65 at the face of valve piston 53 outside the seat rib 58. It will thus be seen that in service applications of the brakes, the fluid pressure on opposite sides of the valve piston 53 is maintained equalized, permitting the spring 59 to hold the valve piston to the position shown in Fig. 1, with the valve 61 unseated, and consequently, the inshot valve device remains inoperative during service applications of the brakes.

When a sudden or emergency reduction in brake pipe pressure is effected, the triple piston 18 moves to application position, as in a service application of the brakes, and fluid under pressure is initially supplied from the auxiliary reservoir to the empty brake cylinder in the same manner as in a service application of the brakes.

Upon a sudden reduction in brake pipe pressure, the emergency piston 25 is shifted to its extreme emergency position, moving the emergency slide valve 29, so that passage 46 is uncovered, permitting the flow of fluid under pressure from valve chamber 26 and the quick action reservoir 28 to the piston chamber 45 of the quick action valve device 13. Piston 44 is then shifted to the right, so that the vent valve 48 is unseated, permitting the venting of fluid from the brake pipe 7, through passage 17 and past the unseated valve 48 to chamber 50 and the atmosphere, by way of passage 51.

A local reduction in brake pipe pressure is thus serially effected on each car of the train to cause the well known quick serial emergency action throughout the train.

In the emergency position of slide valve 29, cavity 106 in the slide valve connects passage 75 with a passage 107 leading to passage 94 and the emergency reservoir 6. Fluid under pressure is therefore supplied from the emergency reservoir to passage 74 and thus to passage 63, so that in an emergency application of the brakes, fluid under pressure is initially supplied both from the auxiliary reservoir and from the emergency reservoir 6 to the empty brake cylinder, past the initially unseated valve 61.

In the same way as in a service application of the brakes, fluid under pressure supplied to pipe 67 is adapted to operate the check valve 89 and the load brake application valve device 2, so that fluid under pressure is also supplied to the load brake cylinder 4. When slide valve 29 moves to emergency position, the passage 57 is lapped, and since in release position, the passage 57 was connected to the atmosphere by way of cavity 98, passage 75, and passage 63, the volume chamber 55 and chamber 54 are now at atmospheric pressure, and consequently, at this time, the valve piston 53 is held in its seated position, as shown in Fig. 1, only by the pressure of spring 59.

When the pressure of fluid supplied past the valve 61 to the empty brake cylinder 3 and acting on the area of the valve piston 53, within the seat rib 58, slightly exceeds the pressure of spring 59, the valve piston 53 will move from its seat, and then the full area of the valve piston being exposed to fluid pressure, the valve piston 53 is promptly shifted to its right hand seat, permitting the valve 61 to be seated by the spring 68.

With valve 61 seated, the rapid initial rate of flow to the brake cylinder is cut off, and fluid under pressure can now flow to the brake cylinder at a restricted rate as permitted by the restricted port 108.

During the delay period in which fluid under pressure is supplied through the port 108 at a restricted rate to the brake cylinder, the pressure of fluid supplied to the brake cylinder 3 is supplied through passage 77 to chamber 76 of the timing valve device 15 and acts on the diaphragm 69. The chamber 72 at the opposite side of the diaphragm is connected through passage 73 with emergency valve chamber 26. Now the pressure in piston chamber 45 and consequently in valve chamber 26 and in the quick action reservoir 28 is being reduced by flow through groove 80, pipe 79, and cavity 81 in change-over valve 78, by flow to the atmosphere through the restricted port 82, and when the increasing pressure of fluid acting in chamber 76 on the diaphragm 69, plus the pressure of fluid supplied from the emergency reservoir 6 through passage 94, passage 107, cavity 106 in emergency slide valve 29, passage 75 and passage 74 to the area of diaphragm 69 outside of the seat rib 70 is sufficient to overcome the pressure of spring 71 and the reducing fluid pressure in chamber 72, the diaphragm 69 will be shifted to the right, so that fluid under pressure is permitted to flow from passage 74 and the emergency reservoir at a rapid rate to passage 77 and the brake cylinder 3, by way of passage 66.

It will thus be seen that in an emergency application of the brakes, when the change-over valve device 8 is set in loaded position, fluid under pressure is supplied initially at a rapid rate to the empty brake cylinder 3 from the auxiliary reservoir and the emergency reservoir and is also supplied from the emergency reservoir to the load brake cylinder 4 by operation of the valve device 2.

When the brake cylinder pressure in the empty brake cylinder has been increased to a predetermined degree, the inshot valve device 14 is operated to restrict the rate at which fluid under pressure is supplied to the brake cylinder, during which period of restricted flow, the slack in the train can run in gently so as to avoid excessive shocks. Finally, when the brake cylinder pressure has been increased to a predetermined degree and the pressure in the quick action reservoir 28 has been sufficiently reduced, the timing valve device 15 operates to permit the flow of fluid to the brake cylinder at a rapid rate, so as to provide the desired final build up of brake cylinder pressure to a high degree.

When the change-over valve device 8 is set in the empty car position, as shown in Fig. 2, cavity 81 in the plug valve 78 connects pipe 84 to the restricted exhaust port 82, so that piston chamber 32 of the load brake controlling valve device 2 is maintained at atmospheric pressure and consequently, in applying the brakes, the load brake cylinder 4 is cut out of action, and fluid under pressure is only supplied to the empty brake cylinder 3.

In the empty car position of the change-over valve device, pipe 79 is connected, through port 83 in the plug valve 78, with restricted passage 86 and the restricted passage 86 is of greater flow area than the restricted passage 82.

It will thus be evident that when an emergency application of the brakes is effected, with the change-over valve device 8 in its empty car position, as shown in Fig. 2, fluid under pressure is vented from the emergency valve chamber 26 and the quick action reservoir 28 at a greater rate than when the change-over valve is in its loaded position.

As a result, the pressure in the chamber 72 of the timing valve device 15 will be reduced in a shorter period of time to a point at which the diaphragm 69 will be operated to permit the final rapid supply of fluid under pressure to the brake cylinder, than is the case on a loaded car, where the change-over valve device is set to its loaded position and fluid is vented from the quick action reservoir by way of the restricted port 82, and as a consequence, the delay period of time, in which the brake cylinder is supplied with fluid under pressure at a restricted rate, is longer on a loaded car than on an empty car.

Furthermore, on a loaded car, the initial inshot includes the supply of fluid under pressure to the load brake cylinder as well as to the empty brake cylinder while on an empty car, the initial inshot involves only the supply of fluid under pressure to the empty brake cylinder.

It will be understood that the feature of controlling the build up of brake cylinder pressure so as to provide an initial inshot of fluid to a brake cylinder, then a retarded flow and a final inshot is broadly claimed in an application of Clyde C. Farmer, Serial No. 612,465, filed May 20, 1932, and that the claims in the present application are intended to cover only certain specific features which are not disclosed in said Farmer application.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, a brake cylinder, and a brake controlling valve device operated upon a reduction in brake pipe pressure for supplying fluid under pressure to the brake cylinder, of means operative in applying the brakes for first permitting the supply of fluid by said brake controlling valve device to the brake cylinder at one rate and for then effecting the supply of fluid to the brake cylinder at a more restricted rate for a period of time, and manually operative means having one position in which the first mentioned means operates to supply fluid at a restricted rate for one period of time and another position in which the first mentioned means operates to supply fluid at a restricted rate to the brake cylinder for another period of time.

2. In a fluid pressure brake, the combination with a brake pipe, a brake cylinder, and a brake controlling valve device operative upon a gradual reduction in brake pipe pressure to supply fluid under pressure to the brake cylinder to effect a service application of the brakes and upon a sudden reduction in brake pipe pressure to supply fluid under pressure to the brake cylinder to effect an emergency application of the brakes, of means operative upon effecting an emergency application of the brakes for restricting the rate of flow of fluid to the brake cylinder for a period of time, valve means for effecting an application of the brakes with greater force on a loaded car, and manually controlled means having a loaded car position in which said valve means is cut into operation and an empty car position in which said valve means is cut out of action, said manually controlled means being operative to vary the period of time in which the rate of flow of fluid to the brake cylinder is restricted.

3. In a fluid pressure brake, the combination with a brake pipe, a brake cylinder, and a brake controlling valve device operated upon a reduction in brake pipe pressure for supplying fluid under pressure to the brake cylinder, of means for restricting the rate at which fluid is supplied to the brake cylinder, means operative upon a predetermined reduction in fluid pressure in a chamber normally charged with fluid under pressure for opening a communication through which fluid under pressure is supplied to the brake cylinder at a greater rate, and manually controlled means having one position in which fluid under pressure is vented from said chamber at one rate and another position in which fluid under pressure is vented from said chamber at another rate.

4. In a fluid pressure brake, the combination with a brake pipe, a brake cylinder, and a brake controlling valve device operated upon a reduction in brake pipe pressure for supplying fluid under pressure to the brake cylinder, of means for restricting the rate at which fluid is supplied to the brake cylinder, means operative upon a predetermined reduction in fluid pressure in a chamber normally charged with fluid under pressure for opening a communication through which fluid under pressure is supplied to the brake cylinder at a greater rate, and manually controlled means for adjusting the braking power according to whether the car is empty or loaded, said manually controlled means being adapted in the empty car position to vent fluid from said chamber at a restricted rate and in the loaded car position to vent fluid from said chamber at a more restricted rate.

5. In a fluid pressure brake, the combination with a brake pipe, a brake cylinder, and a brake controlling valve device operated upon a reduction in brake pipe pressure for supplying fluid under pressure to the brake cylinder, of means for restricting the rate at which fluid is supplied to the brake cylinder, means operative upon a predetermined reduction in fluid pressure in a chamber normally charged with fluid under pressure for opening a communication through which fluid under pressure is supplied to the brake cylinder at a greater rate, a load brake cylinder, a valve device operative to supply fluid under pressure to the load brake cylinder, and manually controlled means having a load position in which said valve device is cut in to operation and an empty car position in which said valve device is cut out of action, said manually controlled means being adapted in load position to vent fluid from said chamber at a certain restricted rate and in empty car position to vent fluid from said chamber at a faster restricted rate.

6. In a fluid pressure brake, the combination with a brake pipe, a brake cylinder, and a brake controlling valve device operative upon a gradual reduction in brake pipe pressure to supply fluid under pressure to the brake cylinder to effect a service application of the brakes and upon a sudden reduction in brake pipe pressure to supply fluid under pressure to the brake cylinder to effect an emergency application of the brakes, of means operative upon effecting an emergency application of the brakes for restricting the rate of flow of fluid to the brake cylinder for a period of time, valve means for effecting an application of the brakes with greater force when operative, manually controlled means for rendering said valve means inoperative, said manually controlled means being operative to vary the period of time in which the rate of flow of fluid to the brake cylinder is restricted.

7. In a fluid pressure brake, the combination with a brake pipe, a brake cylinder, and a brake controlling valve device operated upon a reduction in brake pipe pressure for supplying fluid under pressure to the brake cylinder, of means operative in applying the brakes for restricting the supply of fluid to the brake cylinder for a period of time, and manually operated means having a loaded car position in which the first mentioned means operates to supply fluid at a restricted rate for one period of time and an empty car position in which said means operates to supply fluid at a restricted rate to the brake cylinder for another period of time.

8. In a fluid pressure brake, the combination with a brake pipe, a brake cylinder, and a brake controlling valve device operated upon a reduction in brake pipe pressure for supplying fluid under pressure to the brake cylinder, of means operative in applying the brakes for first permitting the supply of fluid by said brake controlling valve device to the brake cylinder at one rate and for then effecting the supply of fluid to the brake cylinder at a more restricted rate for a period of time, and manually operative means having an empty car position in which the first mentioned means operates to supply fluid at a restricted rate for a period of time and a loaded car position in which the first mentioned means operates to supply fluid at a restricted rate to the brake cylinder for longer periods of time.

9. In a fluid pressure brake, the combination with a brake pipe, a brake cylinder, and a brake controlling valve device operated upon a reduction in brake pipe pressure for supplying fluid under pressure to the brake cylinder, of means for restricting the rate at which fluid is supplied to the brake cylinder, means operative upon a predetermined reduction in fluid pressure in a chamber normally charged with fluid under pressure for opening a communication through which fluid under pressure is supplied to the brake cylinder at a greater rate, and manually controlled means having an empty car position in which fluid under pressure is vented from said chamber at a certain rate and a loaded car position in which fluid under pressure is vented from said chamber at a slower rate.

ELLIS E. HEWITT.